United States Patent
Odajima et al.

(10) Patent No.: US 9,584,001 B2
(45) Date of Patent: Feb. 28, 2017

(54) VIBRATION ACTUATOR

(71) Applicant: Nidec Copal Corporation, Tokyo (JP)

(72) Inventors: Shin Odajima, Tokyo (JP); Yuki Shoda, Tokyo (JP); Masaaki Takagi, Tokyo (JP); Yoshihide Tonogai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 95 days.

(21) Appl. No.: 14/501,825

(22) Filed: Sep. 30, 2014

(65) Prior Publication Data

US 2015/0155767 A1    Jun. 4, 2015

(30) Foreign Application Priority Data

Sep. 30, 2013    (JP) .................. 2013-204259

(51) Int. Cl.
*H02K 33/00*    (2006.01)
*H02K 33/16*    (2006.01)

(52) U.S. Cl.
CPC ..................... *H02K 33/16* (2013.01)

(58) Field of Classification Search
CPC .................. H02K 33/12; H02K 33/16

USPC ....................................... 310/25, 30
See application file for complete search history.

(56) References Cited

U.S. PATENT DOCUMENTS

| 6,192,136 B1* | 2/2001 | Azima | B42D 15/022 |
| | | | 381/338 |
| 2010/0277010 A1* | 11/2010 | Jeon | H02K 33/18 |
| | | | 310/25 |
| 2011/0050008 A1* | 3/2011 | Chang | H02K 33/16 |
| | | | 310/25 |
| 2013/0154401 A1* | 6/2013 | Hong | H02K 33/16 |
| | | | 310/17 |

FOREIGN PATENT DOCUMENTS

JP    2001-347227    12/2001

* cited by examiner

*Primary Examiner* — Hanh Nguyen
(74) *Attorney, Agent, or Firm* — Troutman Sanders LLP (57) ABSTRACT

A vibration actuator includes: a movable element that has a magnet and moves reciprocatingly in a rectilinear manner; first and second coil sections arranged so as to surround the magnet; a housing for accommodating the movable element and the first and second coil sections; and a weight attached to the housing.

4 Claims, 7 Drawing Sheets

VIBRATION ACTUATOR

CROSS-REFERENCE TO RELATED APPLICATION

This application claims priority under 35 U.S.C. §119 to Japanese Patent Application No. 2013-204259, filed on Sep. 30, 2013, the entire content of which being hereby incorporated herein by reference.

TECHNICAL FIELD

The present invention relates to a vibration actuator that generates vibration by colliding movable element.

BACKGROUND

Conventionally, for example, Japanese Patent Application Publication No. 2001-347227 ("the JP '227") is known for the art of this field. The JP '227 discloses a vibrator that is utilized as a calling device, attached to a wireless communication terminal device such as a mobile phone. In such a vibrator, a vibrating element having a permanent magnet is accommodated in the interior of cylindrical body around which a coil is wound. The vibrating element moves reciprocatingly in the direction along the center axis of the cylindrical body and generates a vibration by hitting the striking point members arranged at both ends of the cylindrical body.

However, when the vibration generated with the vibrator of the JP '227 was utilized as a feedback for enhancing the operational feeling of a wireless communication terminal device, there have been instances where the operator had difficulty perceiving the vibration because of the high frequency of the vibration.

An aspect of the present invention is therefore to provide a vibration actuator with the ability to adjust the frequency of a vibration being generated to a frequency that is easily perceived by an operator.

SUMMARY

A vibration actuator of the present invention comprises: a movable element that has a magnet and moves reciprocatingly; a coil arranged so as to surround the magnet; a housing for accommodating the movable element and the coil; and a weight attached to the housing.

The vibration actuator according to the present invention moves the movable element reciprocatingly through coordination of the magnet of the movable element and the coil surrounding the magnet. The movable element, having moved, collides with the housing and generates a vibration.

Herein, when the mass of the overall vibration actuator that has been excited by the collision increases, the frequency of the vibration produced by the collision tends to be lowered. As such, attaching a weight to the housing makes it possible to adjust the frequency of the vibration being generated to a relatively low frequency that is more readily perceived by an operator.

The present invention also comprises a weight whereby the weight is arranged between the coil and the housing so as to surround the coil, where the direction of movement of the movable element serves as an axis.

According to this configuration, arranging the weight between the coil and the housing so as to surround the coil, where a direction of movement of the movable element serves as an axis, makes it possible to arrange the center of gravity of the weight over the movement trajectory of the movable element. For this reason, the vibration actuator can be made to vibrate in the direction of movement of the movable element. As such, any force other than those in the direction of movement of the movable element is suppressed from acting on the movable element, and stress acting on the movable element is reduced, therefore making it possible to enhance the impact resistance of the movable element.

The vibration actuator according to the present invention also comprises: a movable element that has a magnet and moves reciprocatingly; a coil arranged so as to surround the magnet; a housing for accommodating the movable element and the coil; and a weight attached to the movable element.

The vibration actuator according to the present invention moves the movable element reciprocatingly through coordination of the magnet of the movable element and the coil surrounding the magnet. The movable element, having moved, collides with the housing and generates a vibration.

Herein, when the mass of the overall vibration actuator that has been excited by the collision increases, the frequency of the vibration produced by the collision tends to be lowered. As such, attaching the weight to the movable element makes it possible to adjust the frequency of the vibration being generated to a relatively low frequency that is more readily perceived by an operator.

The present invention also comprises a weight whereby the weight is surrounded by the magnet.

According to this configuration, the magnet is arranged so as to surround the weight, and therefore the magnet is increased in size, which can also easily increase the size of the movable element.

According to the vibration actuator of the present invention, it is possible to adjust the frequency of the vibration being generated to a relatively low frequency that is more readily perceived by an operator.

DETAILED DESCRIPTION

Examples of the vibration actuator according to the present invention will be described in greater detail below, with reference to the accompanying drawings.

Example

Figure 1:
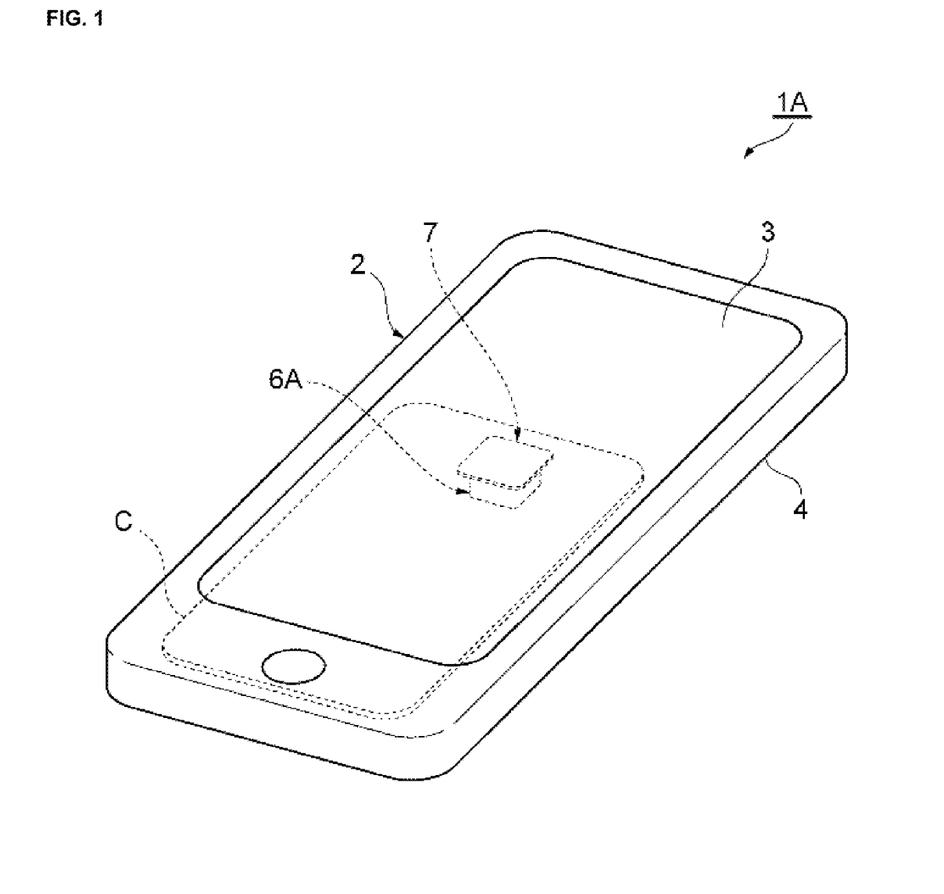
FIG. 1 is an external perspective view illustrating an information terminal processing device provided with a vibration actuator according to the present invention.

As illustrated in FIG. 1, an information terminal processing device 1A is an information terminal, such as a smart phone. The information terminal processing device 1A has a casing 2 that houses a circuit board C, a battery cell, etc.; the casing 2 has a touch panel 3 serving as a sense panel for displaying information and for inputting information, as well as a frame 4 for surrounding the touch panel 3 and forming a strength member of the information terminal processing device 1A. The information terminal processing device 1A has a vibration actuator 6A and vibration transmission unit 7 that are mounted opposite to the display screen side of touch panel 3. The vibration actuator 6A and the vibration transmission unit 7 generate a vibration to let the operator perceive that a normal input operation has been executed when the operator touched and operated the touch panel 3 with a fingertip.

Figure 2:
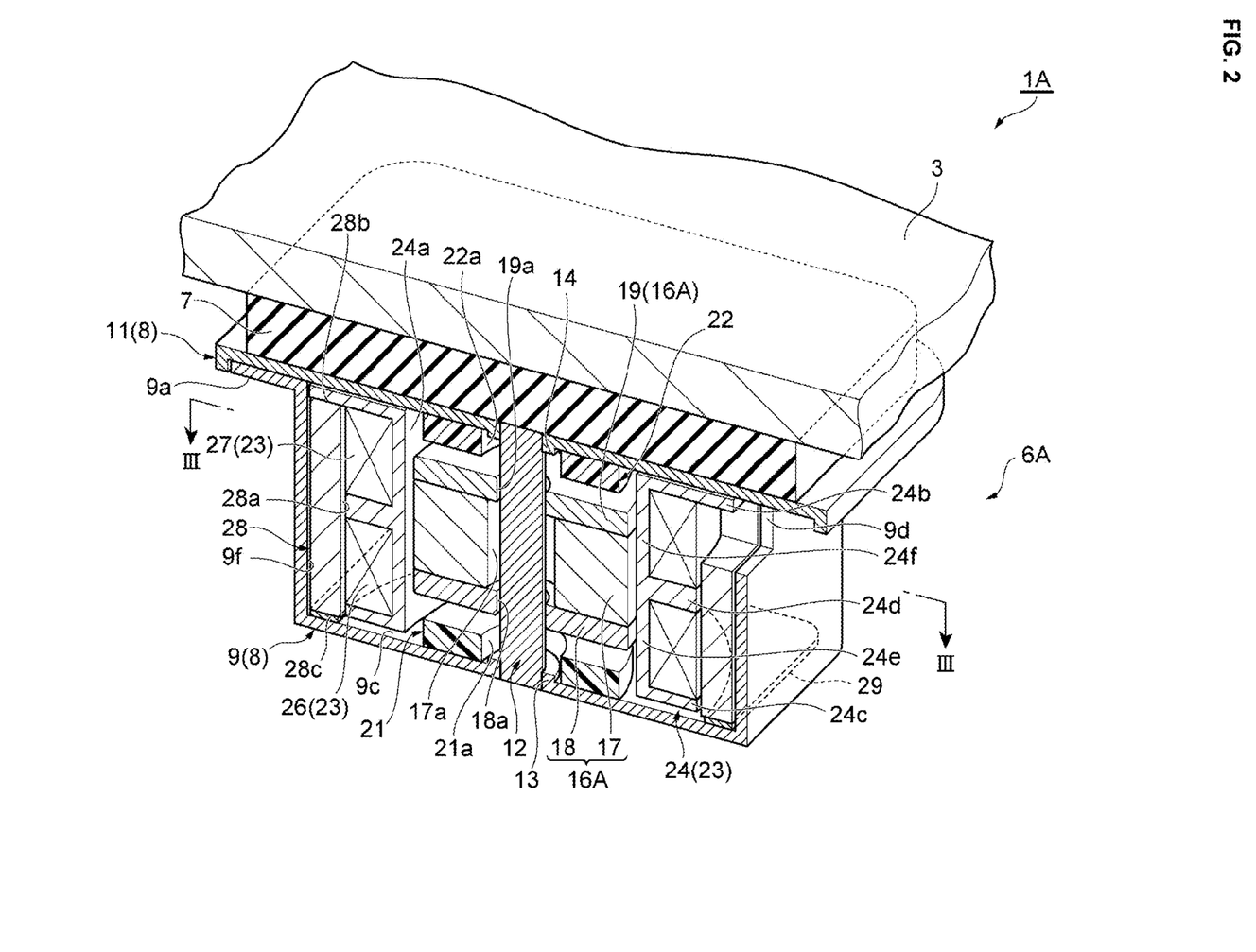
FIG. 2 is a cross-sectional perspective view illustrating the vibration actuator illustrated in FIG. 1.
Figure 3:
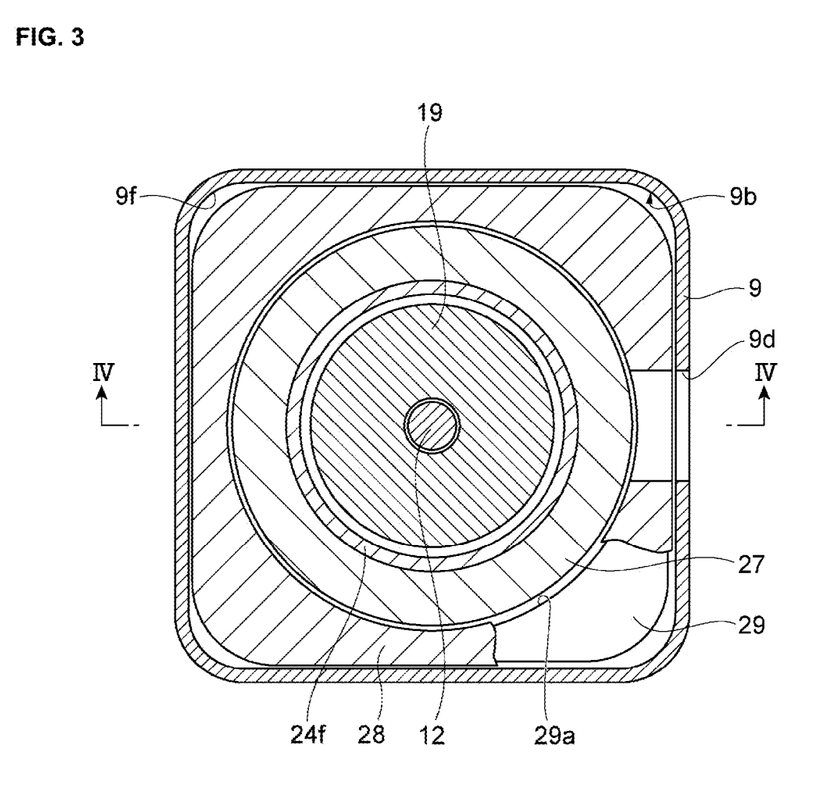
FIG. 3 is a cross-sectional view of the vibration actuator taken along the line of FIG. 2.

As illustrated in FIGS. 2 and 3, a housing 8 of the vibration actuator 6A has a main case unit 9 forming an approximately parallelepiped box shape and a covering 11 for closing off the opening side of the main case unit 9. The main case unit 9 and the covering 11 are composed of stainless steel, as a non-magnetic material. Provided to the main case unit 9 on the opening side is a flange section 9a, and the covering 11 is fixed to the main case unit 9 so as to cover opening 9b (see FIG. 3) and the flange section 9a, thus closing off the opening 9b.

A guide shaft 12 is arranged approximately in the middle of the housing 8. The guide shaft 12 is arranged so that its center axis direction runs along the direction going from the covering 11 towards bottom 9c of the main case unit 9. The guide shaft 12 has a lower end that is fitted to a press-fit hole 13 provided to the bottom 9c of the main case unit 9, and an upper end that is fitted to a press-fit hole 13 provided to the covering 11.

The bottom 9c of the main case unit 9 and the covering 11 together form a pair of walls that face one another in the center axis direction of the guide shaft 12.

The vibration actuator 6A, which has a configuration of a moving magnet type, has a movable element 16A and a stationary element 23. The movable element 16A surrounds the guide shaft 12 and is arranged inside the housing 8 so as to move reciprocally along the center axis direction of the guide shaft 12.

The movable element 16A has a magnet 17 that has been unipolarly magnetized so as to have a north (N) pole and south (S) pole in the center axis direction of the guide shaft 12; a through hole 17a extended in the center axis direction is provided to the magnet 17, and the guide shaft 12 is inserted therethrough. The movable element 16A also has a first yoke 18 bonded to the lower end surface of magnet 17 and a second yoke 19 bonded to the upper end surface of magnet 17. The first and second yokes 18, 19, which are in the shape of thin circular plates, are made so as to cover the entirety of both end surfaces of the magnet 17, and are fixed so as to sandwich the magnet 17 in the center axis direction of the guide shaft 12. Formed in the first and second yokes 18, 19 are guide holes 18a, 19a which, in conjunction with the guide shaft 12, guide the movable element 16A in the center axis direction of the guide shaft 12. As such, the vibration direction in which the movable element 16A linearly moves reciprocatingly coincides with the center axis direction of the guide shaft 12.

With this movable element 16A, because it contains magnet 17 and the first and second yokes 18, 19, the mass increases and the momentum caused by the movement of the movable element 16A can be increased.

Figure 4:
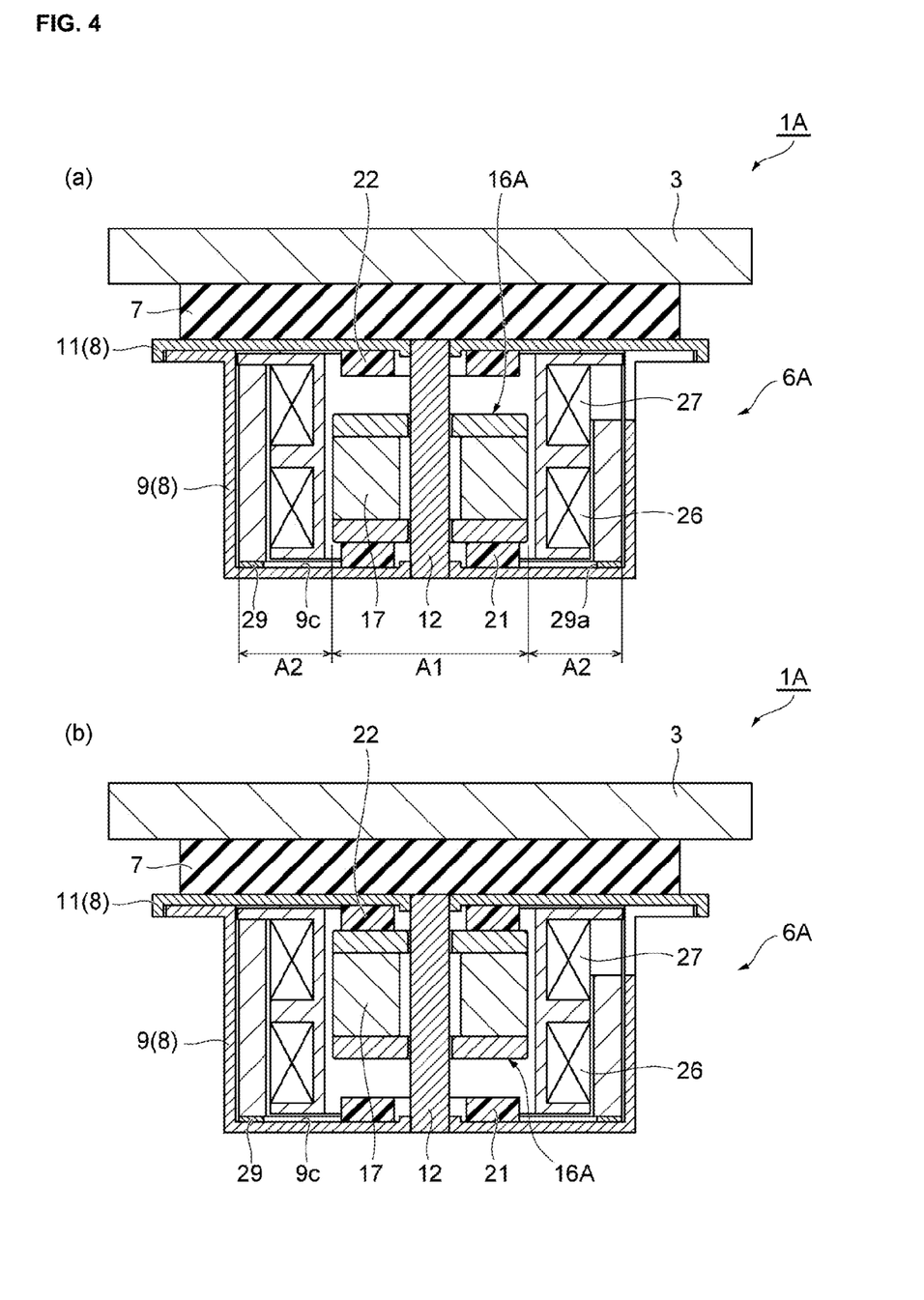
FIG. 4 is a cross-sectional view illustrating the operation of the vibration actuator taken along the IV-IV line of FIG. 3.

At the bottom 9c of the main case unit 9, a cushion 21 is attached to a facing portion A1 (see FIG. 4A) that faces the first yoke 18 and the center axis direction of the guide shaft 12. On the covering 11, a cushion 22 is attached to a portion that faces the second yoke 19 and the center axis direction of the guide shaft 12. The shape of each of the cushions 21, 22 is a ring that has holes 21a, 22a through which the guide shaft 12 is inserted. With this cushion 22, the magnet 17 can be protected from impact. The cushion 22 also makes it possible to reduce an impact noise occurring during collision.

The stationary element 23 is arranged inside the housing 8 so as to surround the movable element 16A. The stationary element 23 has a bobbin 24. The bobbin 24 comprises: an opening 24a extending in the center axis direction of the guide shaft 12; an upper flange section 24b provided to the covering 11 side; a lower flange section 24c provided to the bottom 9c side; and a partition section 24d provided between the upper flange section 24b and the lower flange section 24c. The first bobbin section 24e is formed between the lower flange section 24c and the partition section 24d, and the second bobbin section 24f is formed between the upper flange section 24b and the partition section 24d. The first and second bobbin sections 24e, 24f are provided in parallel in the center axis direction of the guide shaft 12.

The stationary element 23 has two coil sections 26, 27 that are connected in series. The first coil section 26 is formed with a coil wire wound around the first bobbin section 24e so as to correspond to the first yoke 18. The second coil section 27 is formed with a coil wire wound around the second bobbin section 24f so as to correspond to the second yoke 19. The first and second coil sections 26, 27 are provided in parallel in the center axis direction of the guide shaft 12. The directions of winding of the coil wires are opposite to one another, and the ends of the coil wires are led out to the exterior of the housing 8 from a lead opening 9d provided to a side surface of the main case unit 9.

Attached to the housing 8 is weight 28 composed of a relatively dense material (for example, tungsten). The weight 28 is for adjusting the frequency of vibration that is generated by the vibration actuator 6A. The vibration actuator 6A, which generates vibration by impact, tends to have a lower frequency of vibration when the mass of the vibration actuator 6A increases. Therefore, in the vibration actuator 6A, weight 28 is attached to the housing 8 and the mass is creased as an adjustment in order to reduce the Vibration frequency.

The weight 28 surrounds the first and second coil sections 26, 27 with the direction of movement of the movable element 16A as the center axis. Weight 28 is arranged in a gap between the first and second coil sections 26, 27 and an inner wall surface 9f of the main case unit 9 (see FIG. 3). The upper flange section 24b of the bobbin 24 abuts against the upper end surface 28b of weight 28, and the upper flange section 24b causes the weight 28 to be pressed against the bottom 9c side of the main case unit 9. Weight 28, which has a shape of point symmetry with respect to the center axis of the guide shaft 12, has a circular opening 28a into which bobbin 24 and the first and second coil sections 26, 27 can be inserted, and the center of gravity of weight 28 is located along the center axis of the guide shaft 12.

A plate-shaped magnetic body 29 is sandwiched between the bottom 9c and the lower end surface 28c of weight 28 in the center axis direction of the guide shaft 12. An opening 29a (see FIG. 4A) that exposes the entirety of the facing portion A1 faced by the movable element 16A at the bottom 9c is formed in the plate-shaped magnetic body 29, which is an iron plate of a thin, rectangular plate shape. As such, the plate-shaped magnetic body 29 is not arranged on the facing portion A1. The plate-shaped magnetic body 29 is, however, arranged on a non-facing portion A2 that is outside the facing portion A1 at the bottom 9c and that does not face the end surface of the movable element 16A.

A magnetic attraction force is generated between the plate-shaped magnetic body 29 and magnet 17, and the movable element 16A is attracted to the bottom 9c side where the plate-shaped magnetic body 29 is arranged. Therefore, when the first and second coil sections 26, 27 are in a non-energized state, even though the orientation of the vibration actuator 6A may change, the position of the movable element 16A is always maintained on the bottom 9c side where the plate-shaped magnetic body 29 is arranged, and therefore the relationship between the movable element 16A at the start of driving and the direction of movement of movable element 16A is upheld. As such, the movable element 16A can be reliably moved linearly with a foremost signal component of a drive pulse signal, and vibration can be reliably started up in response to the inputting of the drive pulse signal.

The magnitude of the magnetic attraction force acting on magnet 17 can be adjusted by the distance between magnet 17 and the plate-shaped magnetic body 29. Moreover, the magnetic attraction force acting between magnet 17 and the plate-shaped magnetic body 29 has a component that reduces the driving force produced through coordination of the first and second coil sections 26,27 and magnet 17. According to this configuration, the distance between magnet 17 and the plate-shaped magnetic body 29 increases and the magnitude of the magnetic attraction force acting on the movable element 16A is reduced, and therefore a decline in the driving force acting on the movable element 16A can be suppressed.

Vibration transmission unit 7, which is composed of an elastic member, is sandwiched between vibration actuator 6A and touch panel 3. The vibration transmission unit 7 is bonded to the vibration actuator 6A and to the touch panel 3. The vibration transmission unit 7 is for reducing the frequency of the vibration generated at the vibration actuator 6A to a frequency band of 150 to 500 Hz, which is more readily perceived by the operator, and thereby changing the vibration waveform from an impulse waveform that has a sharp peak to a vibration waveform that is close to a sine wave vibration and transmitting same to touch panel 3. A member made of rubber having a density of about 0.3 to 1.0 g/cm3 is particularly suitable for vibration transmission unit 7.

The operation of information terminal processing device 1A shall now be described.

In a state where the operator is not touching the touch panel 3, a drive pulse signal is not inputted to the first and second coil sections 26, 27, and a non-energized state is in effect. At this time, as illustrated in FIG. 4(a), the movable element 16A is attracted to the bottom 9c side of the main case unit 9 by the magnetic attraction force generated between the plate-shaped magnetic body 29 and magnet 17.

In the event that the operator touches touch panel 3 and data is deemed to have been inputted normally, a control unit (not shown) inputs the drive pulse signal to the first and second coil sections 26, 27. This drive pulse signal is set to a frequency in the vicinity of the resonant frequency of touch panel 3 (approximately several hundred Hz). Setting the frequency of the drive pulse signal to the vicinity of the resonant frequency of touch panel 3 makes it possible to increase the vibration amplitude of touch panel 3 through resonance phenomenon. The drive pulse signal has a current set to an orientation in a direction that moves the movable element 16A from the bottom 9c, where the plate-shaped magnetic body 29 is arranged, to the cover 11 side.

Inputting this drive pulse signal to the first and second coil sections 26, 27 makes it possible to reliably start up vibration in response to the inputting of the drive pulse signal.

Figure 5:
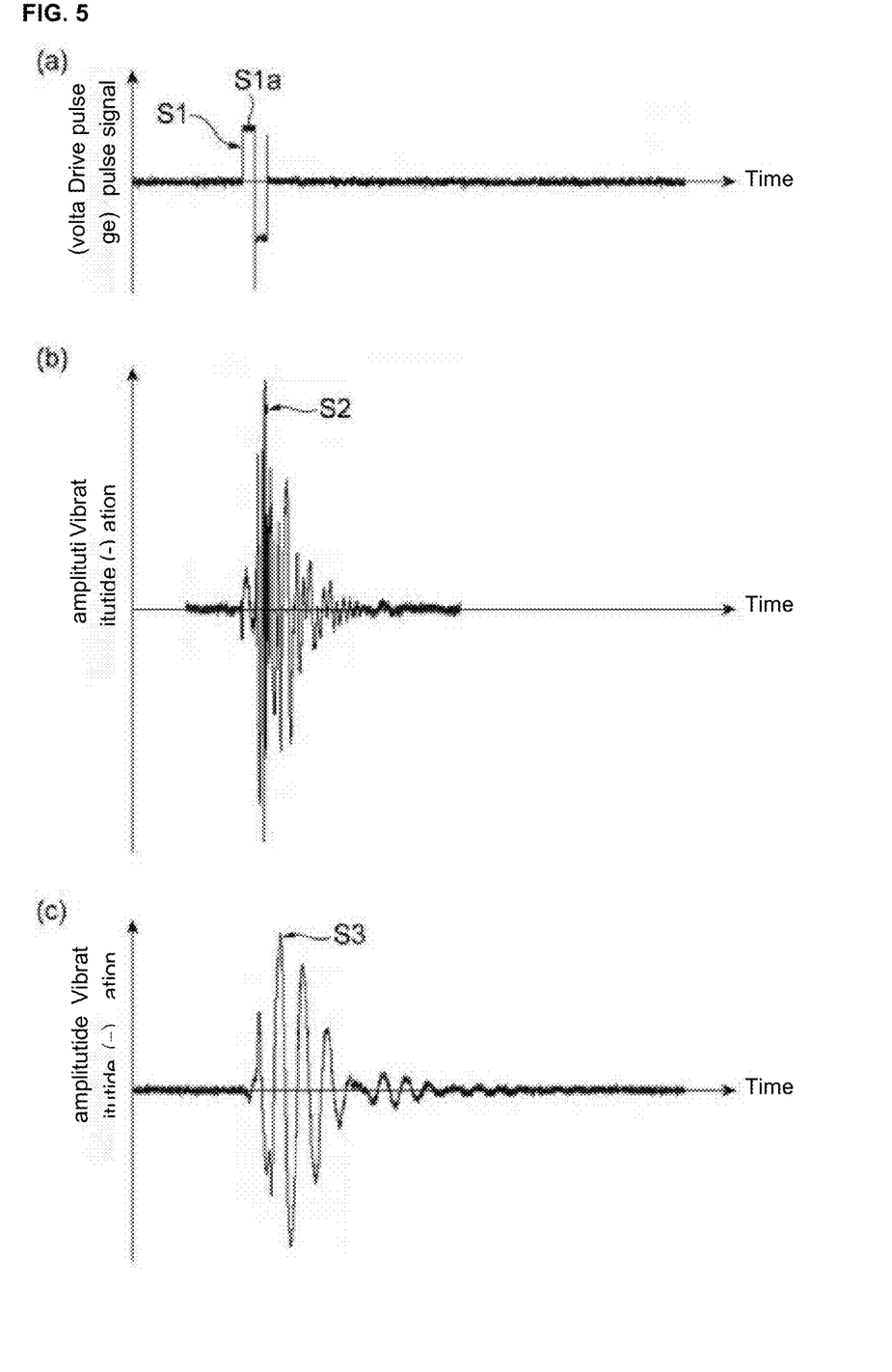
FIG. 5 is a graph illustrating the waveform of a drive pulse signal and a vibration waveform transmitted to a touch panel.

As illustrated in FIG. 4(b), when the drive pulse signal is inputted to the first and second coil sections 26, 27, then a foremost signal component S1a (see FIG. 5(a)) of the drive pulse signal causes the movable element 16A to move towards the covering 11 along the center axis direction of the guide shaft 12, which collides with cushion 22 of covering 11. This collision causes the entirety of the vibration actuator 6A to move along the center axis direction and generates vibration waves; the vibration waves are transmitted to touch panel 3 via vibration transmission unit 7. When the operator perceives the vibration waves that have been transmitted to touch panel 3, the operator senses the operation feeling.

The vibration actuator 6A causes the movable element 16A to move linearly by through coordination of magnet 17 of movable element 16A and the first and second coil sections 26, 27 surrounding magnet 17. Then, having moved linearly, the movable element 16A collides with housing 8 and generates a vibration.

Herein, the frequency of the vibration produced by the collision tends to be lower when the mass of the overall vibration actuator 6A, which has been excited by the collision, increases. As such, attaching weight 28 to housing 8 makes it possible to adjust the frequency of the vibration being generated to a relatively low frequency that is more readily perceived by the operator.

Weight 28 is arranged between the first and second coil sections 26, 27 and housing 8 so as to surround the first and second coil sections 26, 27, with the direction of movement of the movable element 16A as the center axis. According to this configuration, it becomes possible to arrange the center of gravity of weight 28 on the movement trajectory of movable element 16A. Therefore, the vibration actuator 6A can be vibrated in the direction of movement of the movable element 16A. As such, any force other than those in the direction of movement of the movable element 16A is suppressed from acting on the movable element 16A, and stress acting on the movable element 16A is reduced, thereby making it possible to enhance the impact resistance of the movable element 16A.

The vibration actuator 6A has a structure whereby weight 28 is attached to housing 8, which makes it easy to assemble.

In vibration actuator 6A, weight 28, which is a separate body from housing 8, is attached to housing 8 in order to adjust the overall mass. Frequency of vibration that is more readily perceived by the operator is in the range of 150 to 500 Hz, and adjusting the mass of weight 28 and attaching same to housing 8 makes it possible to adjust the frequency of vibration being generated so as to approximate this range. When the frequency of vibration is adjusted so as to approximate the resonant frequency of touch panel 3, etc. to which vibration actuator 6A is attached, then the amplitude is increased by the resonance phenomenon and therefore a vibration that is even more readily perceived by the operator can also be produced.

Vibration actuator 6A generates a vibration by causing movable element 16A to collide with housing 8, and therefore it is possible to produce a vibration that is highly responsive to the operation of touch panel 3. Moreover, in the information terminal processing device 1A, vibration transmission unit 7 is sandwiched between the vibration actuator 6A and touch panel 3, and therefore the frequency of the vibration that is produced by an impact is lowered and the vibration is transmitted to touch panel 3. As such, according to the information terminal processing device 1A, it is possible to impart to touch panel 3 a vibration that is both readily perceived by the operator and highly responsive, and therefore the operation feeling corresponding to operation of touch panel 3 can be improved.

Herein, in order to verify the effects of information terminal processing device 1A, an information terminal processing device 1A was fabricated, and so too was an information terminal processing device as in a comparative example in which a vibration actuator not having weight 28 is directly attached to touch panel 3; the respective waveforms of the vibration transmitted to touch panel 3 was then verified. A drive pulse signal of identical amplitude and identical frequency was inputted to both the information terminal processing device 1A and the information terminal processing device as in the comparative example. More specifically, as illustrated in FIG. 5(a), a drive pulse signal S1 was set to be a single-period signal with a frequency of 440 Hz.

As illustrated in FIG. 5(b), a vibration waveform S2 transmitted to touch panel 3 in the information terminal processing device as in the comparative example was confirmed to have a high frequency and a plurality of sharp peaks.

In turn, as illustrated in FIG. 5(c), in the case where the vibration actuator 6A having weight 28 attached to touch panel 3 with vibration transmission unit 7 interposed therebetween, there was confirmed to be a vibration waveform S3 that had a lower frequency than the vibration waveform S2 of the comparative example illustrated in FIG. 5(b), and is was closer to a sine wave. As such, according to the information terminal processing device 1A in which weight 28 was arranged in vibration actuator 6A to increase the mass and the vibration actuator 6A was attached to touch panel 3 via vibration transmission unit 7 interposed therebetween, it was found to be possible to generate a vibration that is readily perceived by the operator.

Moreover, according to the information terminal processing device 1A, the vibration is produced by causing the movable element 16A to collide with cushion 22, and therefore the vibration has a shorter duration of starting and stopping compared to a vibration actuator (comparative example 1) with which an eccentric weight has been attached to a rotary motor, or a vibration actuator (comparative example 2) with which the resonance of a spring is utilized; therefore, the sharpness and feel of the vibration can be enhanced as a haptic feedback. It is also possible to enhance the response speed according to a vibration actuator (comparative example 3) with which a piezoelectric element is utilized, but the piezoelectric element requires an increase in size in order to obtain the vibration amplitude that can be perceived by the operator. By contrast, with the information terminal processing device 1A of the present example, the size is smaller compared to the vibration actuator (comparative example 3) with which a piezoelectric element is utilized.

Another Example

Figure 6:
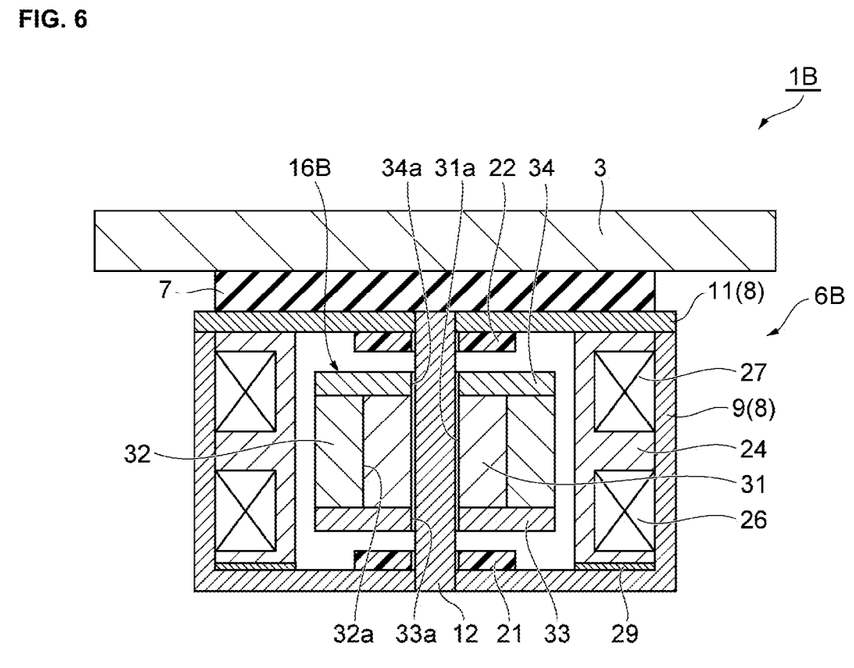
FIG. 6 is a cross-sectional view illustrating the Another Example of a vibration actuator according to the present invention.

An information terminal processing device of Another Example shall now be described. As illustrated in FIG. 6, an information terminal processing device 1B differs from the information terminal processing device 1A of Example in that a weight 31 in a vibration actuator 6B is provided to a movable element 16B. Weight 31 shall be described in greater detail below; any description of elements shared with the information terminal processing device 1A of the Example will be omitted.

Weight 31, which has a cylindrical shape, is arranged in a through hole 32a provided to a magnet 32 so as to be surrounded by said magnet 32. The guide shaft 12 is inserted into a through hole 31a provided approximately to the middle of weight 31. A first yoke 33 to which a guide hole 33a is provided is bonded to a lower surface of magnet 32 and weight 31 in the center axis direction of guide shaft 12, and a second yoke 34 to which a guide hole 34a is provided is bonded to an upper end surface of the magnet 32 and weight 31.

With vibration actuator 6B, similarly to vibration actuator 6A of the Example, attaching weight 31 to movable element 16B makes it possible to adjust the frequency of the vibration generated to a frequency that can be more readily perceived by the operator.

Because weight 31 is surrounded by magnet 32, the size of the magnet 32 is increased, and movable element 16B can also easily be increased in size.

Furthermore, according to vibration actuator 6B, the mass of movable element 16B is further increased, and therefore the momentum of movable element 16B can be increased. When the momentum of movable element 16B is increased, the amplitude of the vibration waveform produced when movable element 16B is collided with cushion 21 or cushion 22 increases, and therefore it is possible to produce a considerable vibration that can be reliably sensed by the operator.

The present invention is not limited to the examples described above, and a variety of modifications, such as what follows, can be made within a scope that does not depart from the essence of the present invention.

Figure 7:
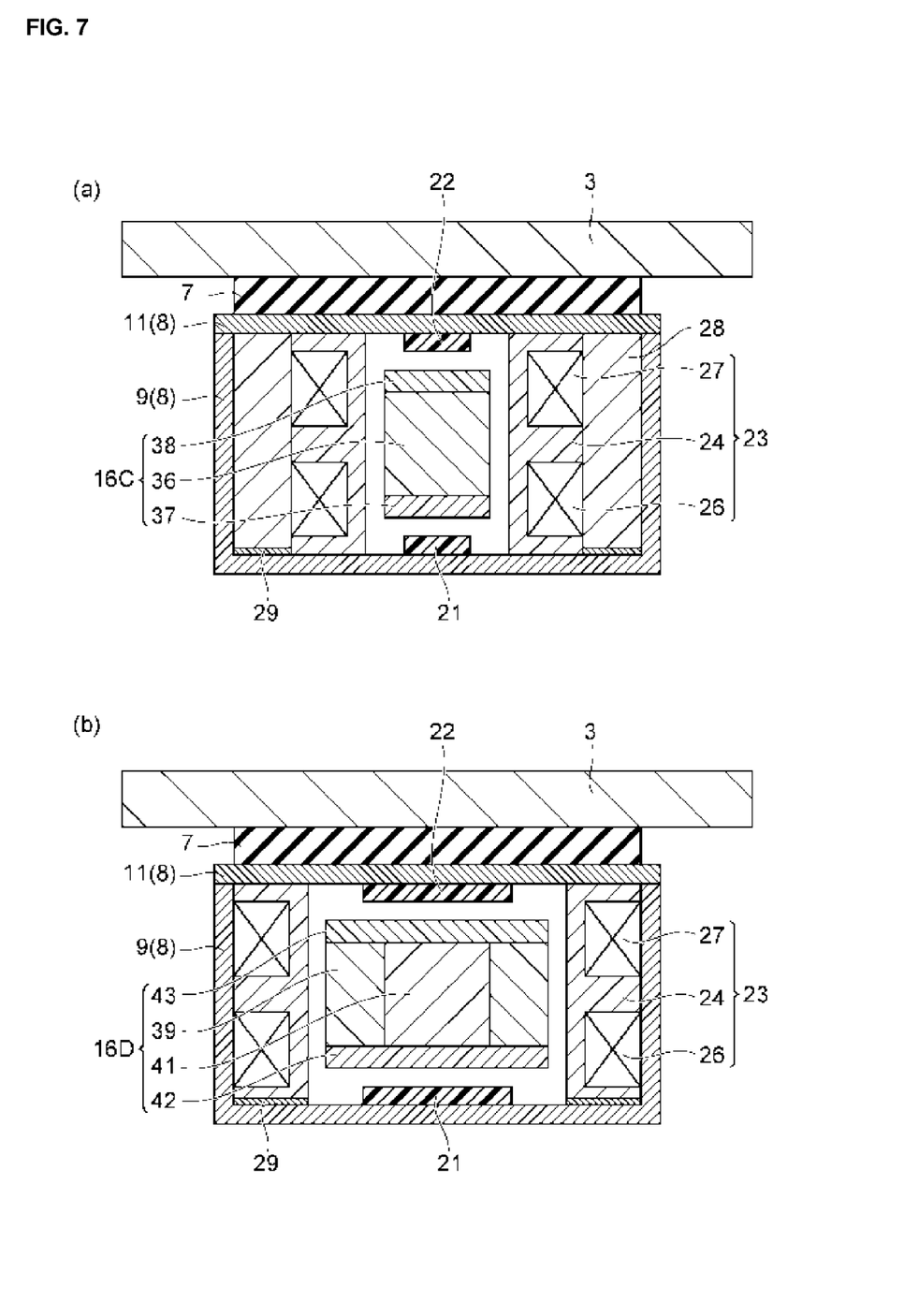
FIG. 7 is a cross-sectional view illustrating modification examples of a vibration actuator according to the present invention.

As illustrated in FIG. 7(a), the vibration actuator 6A of the Example need not be provided with guide shaft 12, and may be provided with a movable element 16C instead of the movable element 16A. Movable element 16C has yokes 37, 38 attached to two ends of a cylindrical magnet 36.

According to such a configuration, there will no longer be contact between the guide holes 18a, 19a of movable element 16A (see FIG. 2) and guide shaft 12, and therefore the moving speed of movable element 16A can be raised and the momentum of movable element 16A can be increased.

As illustrated in FIG. 7B, the vibration actuator 6B of the Another Example likewise need not be provided with guide shaft 12, and may be provided with a movable element 16D instead of the movable element 16B. Movable element 16D has a weight 41 fitted to the interior of a cylindrical magnet 39, and yokes 42, 43 attached to two ends of weight 41 and magnet 39. With such a configuration, as well, there will no longer be contact between the guide holes 33a, 34a of movable element 16B (see FIG. 6) and guide shaft 12, and therefore the moving speed of movable element 16B can be raised and the momentum of movable element 16B can be increased.

Movable element 16A may move from the bottom 9c side of housing 8 to the covering 11 side and collide with cushion 22 of covering 11, and thereafter drive further to the bottom 9c side and collide with cushion 21 of bottom 9c. The movable element 16A may also be actuated reciprocatingly between cushion 21 and cushion 22, thus generating a plurality of collisions.

The vibration actuators 6A, 6B may be provided with a guide tube (not shown), instead of the guide shaft 12, for accommodating movable elements 16A, 16B and guiding same in the vibration direction.

The vibration actuators 6A, 6B may be attached to frame 4 forming casing 2 of the information terminal processing devices 1A, 1B, or may be attached to the circuit board C arranged inside casing 2.

The number of coils of vibration actuators 6A, 6B is not limited to being two, and there may be one coil or two or more coils. Cushions 21, 22 of vibration actuators 6A, 6B may be bonded to the upper surface of the second yokes 19, 33 and the lower surface of the first yokes 18, 34.

The plate-shaped magnetic body 29 may be arranged so as to be sandwiched between the upper flange section 24b of bobbin 24 and covering 11. According to this configuration, the position of movable element 16A in the non-energized state can be set to the covering 11 side. In this manner, the position of movable element 16A in the non-energized state can be set to the bottom 9c side (see FIG. 4(a)) or the covering 11 side, depending on the orientation of attachment of the vibration actuator 6A to touch panel 3 or depending on the vibration direction.

The plate-shaped magnetic body 29 may be arranged between the bottom 9c and first coil section 26, or may be arranged between covering 11 and second coil section 27. Furthermore, the plate-shaped magnetic body 29 may be arranged between the bottom 9c and cushion 21, or may be arranged between covering 11 and cushion 22.

According to these configurations, the distance between the plate-shaped magnetic body 29 and magnet 17 is shorter than in a case where the plate-shaped magnetic body 29 is arranged so as to face weight 28, and therefore there is a greater magnetic attraction force acting on movable element 16A. As such, even in a case where an intense vibration or impact is applied from the exterior to the information terminal processing device, movable element 16A can be reliably attracted to the bottom surface 29c side or the covering 11 side in the non-energized state of the first and second coil sections 26, 27.

The information terminal processing devices 1A, 1B are in no way limited to being a communication terminal such as a mobile telephone or smart phone, but rather may be used in a device provided with touch panel 3, such as a vending machine, automatic ticket vending machine, personal computer, or information kiosk.

The present working examples have been described as being a panel that is directly touched as a sense panel, but, for example, the sense panel may be a panel that is operated by proximity. The sense panel may also be a panel that uses a pen-type inputting means and is operated by contact or proximity. A plurality of vibration patterns can be obtained by arranging a plurality of vibration actuators 6A, 6B in the device.

Further Examples

Herein, materials that can be suitably used as the elastic member used for vibration transmission unit 7 shall be described.

In the present invention, suitable materials for vibration transmission unit 7 include: styrene gel (KG Gel made by Kitagawa Industries; product number: YMG90V; density: 1.29 g/cm3), silicone gel (silicone film made by Taica; product number: θ-7; density; 1.06 g/cm3), or urethane foam (made by Inoac; product number: SR-S15P; density: 0.15 g/cm3). According to vibration transmission unit 7 composed of these materials, the frequency of the vibration being transmitted to touch panel 3 can be lowered compared to a case where vibration actuator 6A were to be attached directly to touch panel 3.

In the present invention, materials for vibration transmission unit 7 that are more suitable include: natural rubber (density: 0.93 g/cm3), styrene gel (KG Gel made by Kitagawa Industries; product number: YUM80BK; density: 0.87 g/cm3), and urethane foam (made by Inoac; product number: WP-32P; density: 0.32 g/cm3; product number: WP-40P; density 0.40 g/cm3; product number: SR-S48P; density: 0.48 g/cm3). According to vibration transmission unit 7 composed of these materials, the frequency of the vibration being transmitted to touch panel 3 can be lowered compared to a case where the vibration actuator 6A were to be attached directly to touch panel 3. It is furthermore possible to suppress any decrease in the amplitude of the vibration and to ensure an amplitude of vibration that is suitable for perception by the operator.

On the other hand, an ether-based polyurethane (made by Sanshin Enterprises; product number: Sorbo S; density: 1.38 g/cm3) (made by Sanshin Enterprises; product number: Sorbo M; density: 1.38 g/cm3) would not be suitable because the frequency of the vibration transmitted to touch panel 3 would rise, similarly to a case where the vibration actuator 6A were to be directly attached to touch panel 3.

The invention claimed is:

1. A vibration actuator comprising:
    a movable element that has a magnet and moves reciprocatingly;
    a coil arranged so as to surround the magnet;
    a housing for accommodating the movable element and the coil; and
    a weight attached to the housing;
    wherein the movable element is unattached from the housing.

2. The vibration actuator according to claim 1, wherein the weight is arranged between the coil and the housing so as to surround the coil, and the direction of movement of the movable element serves as an axis of the surrounding.

3. A vibration actuator comprising:
    a movable element that has a magnet and moves reciprocatingly;
    a coil arranged so as to surround the magnet;
    a housing for accommodating the movable element and the coil; and
    a weight attached to the movable element;
    wherein the movable element is unattached from the housing.

4. The vibration actuator according to claim 3, wherein the weight is surrounded by the magnet.

* * * * *